(12) United States Patent
Monsorno

(10) Patent No.: US 6,337,791 B1
(45) Date of Patent: Jan. 8, 2002

(54) CAPACITOR FEATURING INTERNAL ELECTRODE WITH PAD

(75) Inventor: Richard Monsorno, Jacksonville, FL (US)

(73) Assignee: American Technical Ceramics Corporation, Huntington Station, NY (US)

( * ) Notice: Subject to any disclaimer, the term of this patent is extended or adjusted under 35 U.S.C. 154(b) by 0 days.

(21) Appl. No.: 09/596,673

(22) Filed: Jun. 19, 2000

(51) Int. Cl.[7] ............................................. H01G 4/228
(52) U.S. Cl. ............................ 361/306.1; 361/308.1; 361/309
(58) Field of Search ..................... 361/306.1, 306.3, 361/308.1, 309, 310, 311–313, 321.2, 321.3, 321.4, 321.5

(56) References Cited

U.S. PATENT DOCUMENTS

| | | | | |
|---|---|---|---|---|
| 3,694,710 A | * | 9/1972 | Kirschner | 361/321.2 |
| 5,345,361 A | * | 9/1994 | Billotte et al. | 361/313 |
| 5,347,423 A | * | 9/1994 | deNeuf et al. | 361/313 |
| 5,561,586 A | * | 10/1996 | Tomohiro et al. | 361/303 |
| 6,154,356 A | * | 11/2000 | Kagata et al. | 361/303 |

* cited by examiner

*Primary Examiner*—Anthony Dinkins
(74) *Attorney, Agent, or Firm*—Charles E. Baxley, Esq.

(57) ABSTRACT

A monolithic capacitor chip includes a first electrode layer enclosed in a ceramic which comprises a ceramic layer. The first electrode is on one side of the ceramic layer. A second electrode is formed as a pad for contact with the other side of the ceramic layer. In one embodiment of the present invention, the first electrode is accessed electrically by way of an end cap. In another embodiment the first electrode is accessed electrically by way of a conductive via through the ceramic layer.

2 Claims, 3 Drawing Sheets

CAPACITOR FEATURING INTERNAL ELECTRODE WITH PAD

BACKGROUND OF THE INVENTION

The present invention relates generally to capacitors and more particularly to laminated capacitors with plural-layered configurations comprising at least one dielectric ceramic layer sandwiched between electrode layers.

A typical construction of a laminated ceramic capacitor is shown in U.S. Pat. No. 5,014,158 to Nishimura et al.

In U.S. Pat. No. 5,576,926 to Monsorno there is taught a capacitor with an electrically isolated electrode buried between ceramic layers.

End caps are disclosed typically in U.S. Pat. No. 4,458,294 to Womack.

OBJECTS AND SUMMARY OF THE INVENTION

It is an object of the present invention to provide a capacitor that retains superior high frequency attributes of the capacitor taught in the '926 Monsorno Patent while reducing space needed on a mother board. Capacitors according to the present invention have more than four times the capacity of those taught in the '926 Patent for the same size unit with the same dielectric thickness.

Another object of the present invention is further to increase resonance frequency of capacitors having buried electrodes over resonance frequencies of prior art capacitors with plural-layered configurations.

Another object of the present invention is to optimize board space utilization of capacitors.

Another object of the present invention is to provide a capacitor which can be manufactured in quantity at a low unit cost with superior quality.

Another object of the present invention is to provide a capacitor which performs well over a broad range of operating temperatures.

Another object of the present invention is to provide a capacitor which is highly reliable.

Yet another object of the present invention is to provide a capacitor that is particularly effective at very high frequencies.

In accordance with the present invention there is provided a capacitor which includes a dielectric layer having a first surface and a second surface. A first electrode is provided on the first surface. A second electrode, arranged on the second surface, is formed as a pad. The first electrode develops capacitance relative to the second electrode. The first electrode is organized to be operable at a different level of polarity from that of the second electrode.

The crux of the present invention is to position the first electrode in the ceramic and to form the second electrode on the pad. Connection to the first electrode is either from an end cap or by way of a conductive via through the dielectric layer.

The foregoing and other objects and advantages of the present invention will appear in detail hereinafter. In accordance with the present invention there is provided a laminated capacitor comprising dielectric ceramic layers sandwiched about a first electrode. A second electrically conductive layer is positioned outwardly of one of the ceramic layers and is formed as a pad.

BRIEF DESCRIPTION OF DRAWINGS

The foregoing and other objects, features and advantages of the present invention will be apparent from a detailed description which follows, taken in connection with accompanying drawings wherein like numerals refer to like parts and in which.

DESCRIPTION OF PREFERRED EMBODIMENTS

Figure 1:
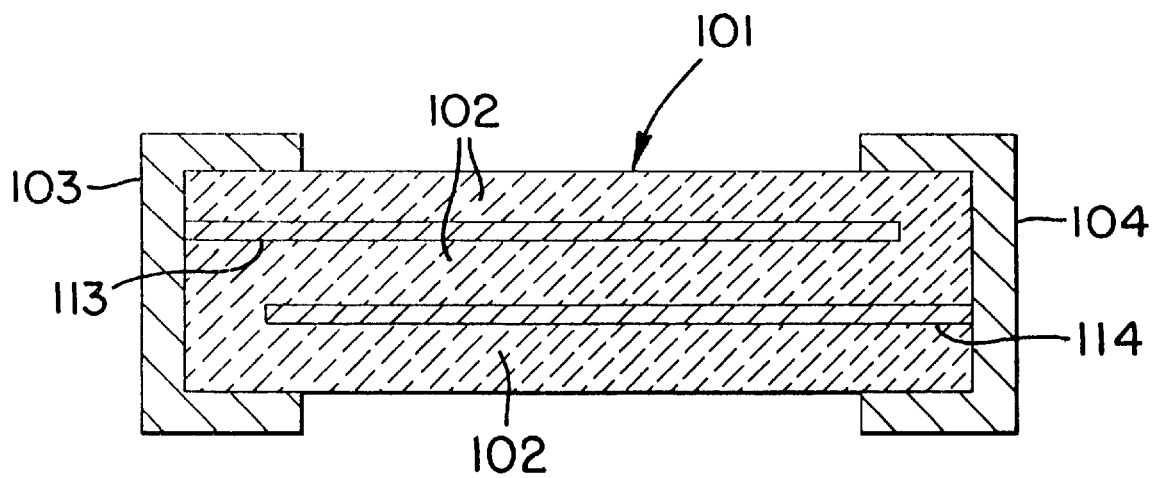
FIG. 1 is an elevational view in cross-section of a conventional two electrode capacitor according to prior art.

FIG. 1 illustrates schematically a laminated ceramic capacitor generally designated 101 according to the prior art and known generally as a multi-layered capacitor (MLC). The MLC is typified by Nishimura et al. U.S. Pat. No. 5,014,158. The MLC comprises a plurality of alternating inner electrode layers sandwiched for developing a capacitance. Dielectric layers 102 are sandwiched alternately with electrode layers. A pair of end cap electrodes 103, 104 each is coupled respectively to associated electrodes 113, 114 for output of the capacitance.

Figure 2:
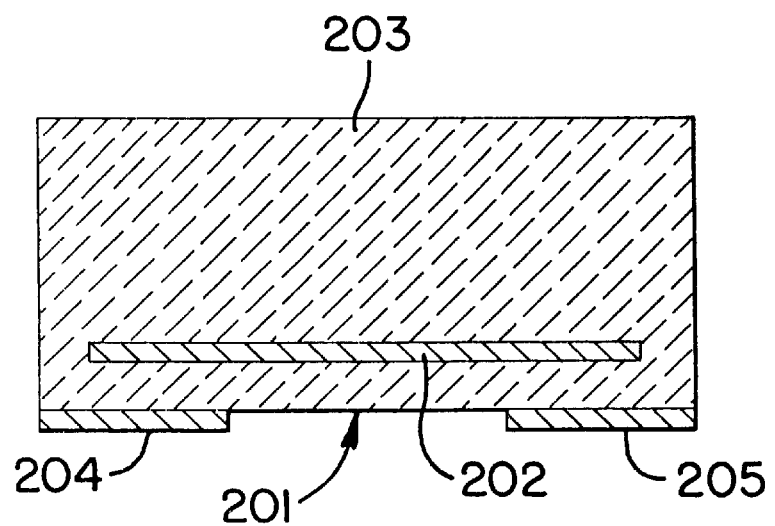
FIG. 2 is an elevational cross-sectional view of an isolated electrode capacitor according to the '926 Monsorno Patent which also represents prior art.

In FIG. 2 there is illustrated schematically a buried (electrically isolated) layer capacitor (BMC) generally designated 201 according to the prior art and described more fully in Monsorno U.S. Pat. No. 5,576,926. The BMC typically includes a second electrode layer 202 buried in ceramic 203 and having a first electrode pad 204 and a third electrode pad 205. The first electrode pad 204 develops capacitance with the second electrode layer 202 and a second electrode layer 202 in turn develops capacitance with the third electrode pad 205, whereby the BMC is generally regarded to be equivalent to two capacitors arranged in series with each other.

Figure 3:
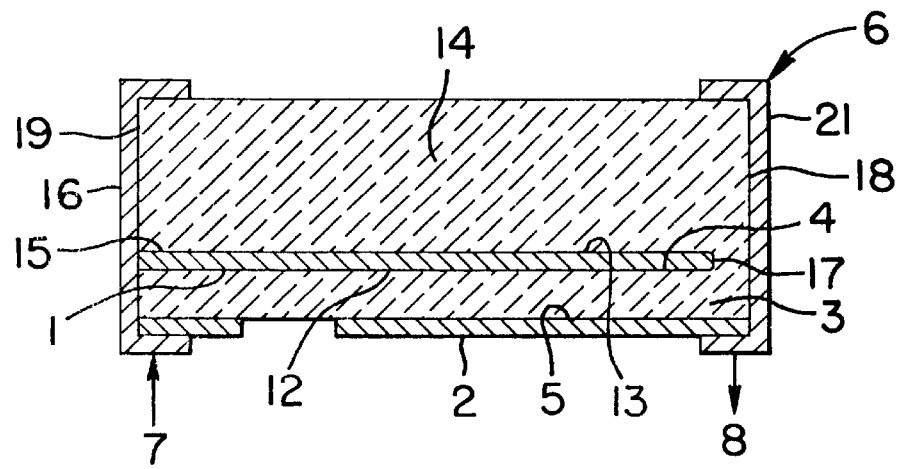
FIG. 3 is a first embodiment shown in an elevational cross-sectional view of a capacitor according to the present invention with an internal electrode mounted from an end cap, and with a second electrode formed as a pad.

Referring to FIG. 3, a capacitor according to the present invention includes a first internal electrode layer, 1 and a second electrode layer 2 formed as a pad. The electrodes 1, 2 sandwich between them a first dielectric layer 3 having a first dielectric surface 4 and a second dielectric surface 5. The first internal electrode layer 1 is on the first dielectric surface 4 at the second electrode layer 2 is arranged for contact with the second dielectric surface 5. For operation of the capacitor generally designated 6 the first internal electrode layer 1 is connected to a source of electric current designated by arrow 7 so as to be operable at a different level of polarity from that of the second pad electrode 2. Another electrical connection is designated by arrow 8.

The first dielectric layer 3 has a first length dimension 9 and a first width dimension 11 as well as the first dielectric surface 4 and the second dielectric surface 5. A covering second dielectric layer 14 cooperates with the first dielectric layer 3 to enclose the first electrode layer 1 therebetween.

As best seen in the embodiment of FIG. 3, the first electrode layer 1 is connected electrically at its first electrode layer end 15 to a first end cap 16. The first electrode layer 1 has a second electrode end 17 spaced inwardly from an end 18 and from an end 19 of the second dielectric layer 14. Second end cap 21 encloses the dielectric end 18.

The first electrode layer 1 is surrounded and literally buried in ceramic. The first electrode layer I has a first electrode surface 12 and a second electrode surface 13 on the obverse side from the first electrode surface 12. The second covering dielectric layer 14 has a second length dimension and a second width dimension co-extensive respectively with those 9, 11 of the first dielectric layer 3, whereby the first 3 and second 14 dielectric layers cooperate to surround and virtually enclose the first electrode 1 in the ceramic. By this expedient the first electrode 1 simulates behavior of a buried layer electrode as taught in the '926 Monsorno Patent. The first 3 and second 14 dielectric layers combine to describe a margin 22 outward of the first electrode layer.

Figure 4:
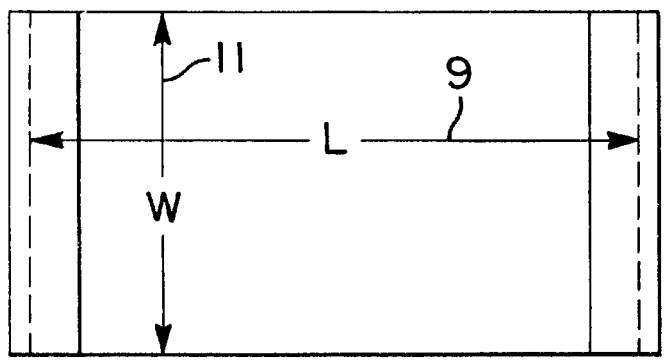
FIG. 4 is a top view of the capacitor of FIG. 3.
Figure 5:
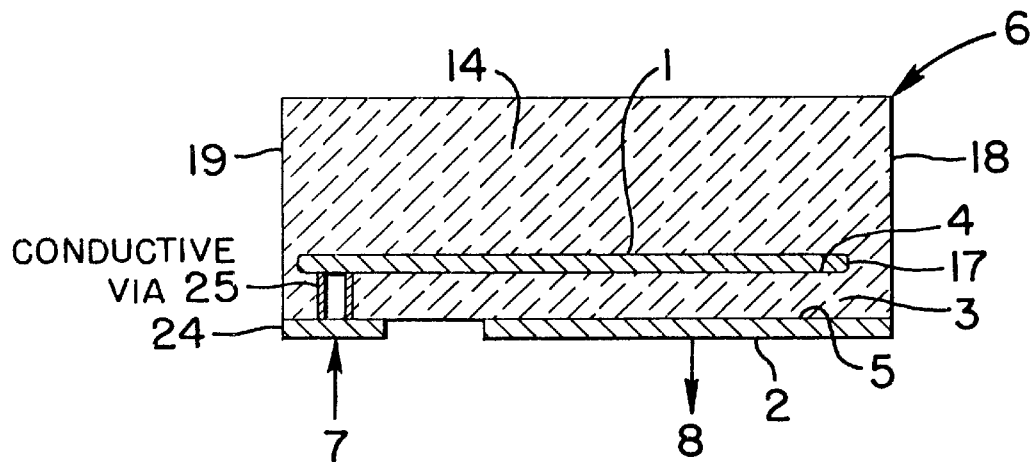
FIG. 5 is an elevational cross-sectional view of a second embodiment of the present invention wherein the first internal electrode is accessed by means of a conductive via or vias passing through the dielectric layer.
Figure 6:
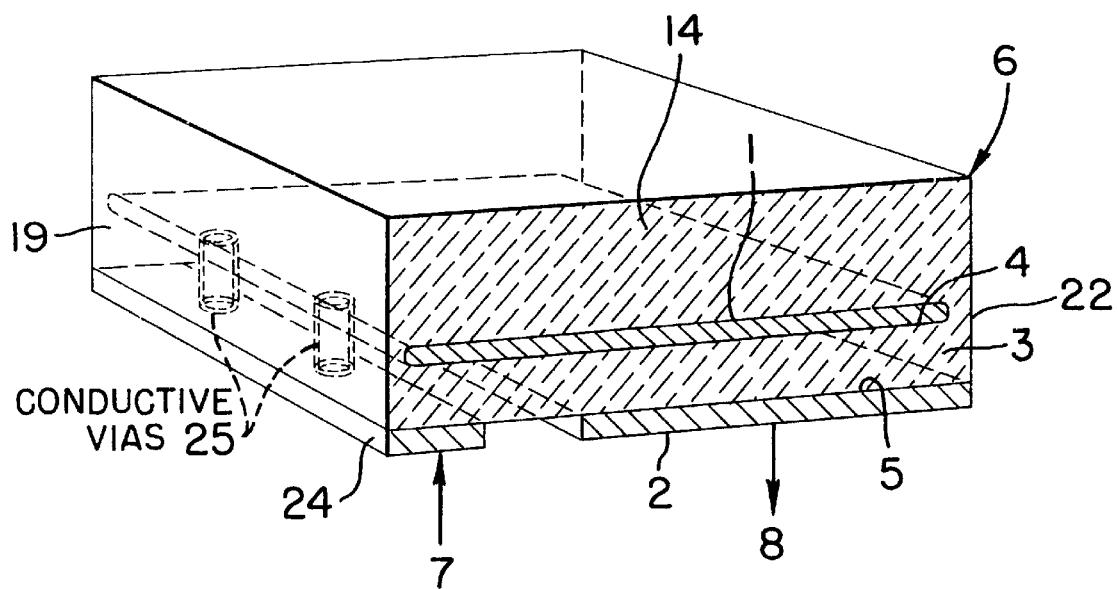
FIG. 6 is an isometric cross-sectional view of the embodiment of FIG. 4 showing the conductive via in greater detail.

In the alternative embodiment shown in FIGS. 4 and 5, electric current 7 is accessed to the first internal electrode 1 by way of a conductor 24 arranged in series with a conductive via 25 which passes through the first dielectric layer 3. The conductive via 25 usually is printed full of metal paste.

Trimming of the margin 22 is available as a means for adjusting pre-selected operative characteristics of the capacitor 6.

Having described the present invention in detail, it should be apparent that one skilled in condenser manufacture and use will be able to devise variations and modifications thereto without departing from its theme of invention. Accordingly scope of the present invention is to be determined from claims which follow.

I claim:

1. A monolithic capacitor chip comprising:

a first electric layer, with the first dielectric layer having a first length dimension and a first width dimension, and with the first dielectric layer having a first dielectric surface and a second dielectric surface, and with the first dielectric layer having a first dielectric layer end and a second dielectric layer end;

a first electrode layer mounted on the first dielectric surface of the first dielectric layer, with the first electrode layer having a first electrode layer end aligned with the first dielectric layer end of the first dielectric layer, and with the first electrode layer having a second electrode layer end spaced inwardly from the second dielectric layer end of the first dielectric layer;

the first electrode layer having a first electrode surface and a second electrode surface on the obverse side from the first electrode surface;

a second dielectric layer, with the second dielectric layer having a second length dimension and a second width dimension, and with the second length and second width dimensions of the second dielectric layer co-extensive with the first length and the first width dimensions respectively of the first dielectric layer, and with the second dielectric layer on the second electrode surface so that the first and the second dielectric layers combine to enclose the first electrode layer and to describe a margin outward of the first electrode layer end;

a first electrically conductive single-layer cap member connected to the first end of the first electrode layer and enclosing an end formed by the first and the second dielectric layers;

a second single-layer cap member outward of the second end of the electrode further enclosing another end formed by the first and the second dielectric layers outwardly of the second end of the electrode layer;

a second electrode layer formed as a pad for contact with the second surface of the first dielectric layer;

the first electrode layer connectable to a source of electric current so as to be operable at to a different level of polarity from that of the second electrode layer.

2. A monolithic capacitor chip comprising:

a first dielectric layer, with the first dielectric layer having a first length dimension and a first width dimension, and with the first dielectric layer having a first dielectric surface and a second dielectric surface, and with the first dielectric layer having a first dielectric layer end and a second dielectric layer end;

a first electrode layer mounted on the first dielectric surface of the first dielectric layer, with the first electrode layer having a first electrode layer length dimension and a first electrode layer width dimension each smaller than the respective first dielectric layer length dimension and the first dielectric layer width dimension;

the first electrode layer having a first electrode surface and a second electrode surface on an obverse side from the first electrode surface, and with the first electrode surface on the first dielectric surface of the first dielectric layer;

a second dielectric layer, with the second dielectric layer having a second dielectric length dimension and a second dielectric layer width dimension, and with the second dielectric layer length and the second dielectric layer width dimensions co-extensive with the first dielectric layer length and the first dielectric layer width dimensions respectively of the first dielectric layer, and with the second dielectric layer on the second electrode surface so that the first dielectric layer and the second dielectric layer combine to describe a margin outward of the first electrode layer;

a second electrode layer formed as a pad for contact with the second surface of the first dielectric layer;

the first electrode layer connectable to a source of electric current by way of one or more conductive vias through the first dielectric layer so as to be operable at a different level of polarity from that of the second electrode layer.

* * * * *